United States Patent
Ripley

(10) Patent No.: US 10,840,810 B2
(45) Date of Patent: *Nov. 17, 2020

(54) DEVICES AND METHODS RELATED TO BOOST SUPPLY FOR LOW BATTERY 2G BIAS SUPPORT

(71) Applicant: SKYWORKS SOLUTIONS, INC., Woburn, MA (US)

(72) Inventor: David Steven Ripley, Marion, IA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,303

(22) Filed: Sep. 2, 2019

(65) Prior Publication Data
US 2020/0091820 A1    Mar. 19, 2020

Related U.S. Application Data

(63) Continuation of application No. 15/043,613, filed on Feb. 14, 2016, now Pat. No. 10,418,900.

(60) Provisional application No. 62/116,455, filed on Feb. 15, 2015.

(51) Int. Cl.
*H04W 4/00* (2018.01)
*H02M 3/158* (2006.01)
*H02M 1/00* (2006.01)

(52) U.S. Cl.
CPC ...... *H02M 3/158* (2013.01); *H02M 2001/008* (2013.01); *H02M 2001/009* (2013.01); *H02M 2001/0022* (2013.01)

(58) Field of Classification Search
CPC .................................................. H02M 3/1582
See application file for complete search history.

(56) References Cited

U.S. PATENT DOCUMENTS

| | | | |
|---|---|---|---|
| 6,580,321 B1 | 6/2003 | Arell et al. |
| 7,606,016 B1 | 10/2009 | Loeb et al. |
| 8,644,777 B2 | 2/2014 | Ripley et al. |
| 2008/0278136 A1 | 11/2008 | Murtojarvi |
| 2010/0219684 A1 | 9/2010 | Iino |
| 2013/0141948 A1 | 6/2013 | Bailey et al. |
| 2013/0200829 A1 | 8/2013 | Won et al. |
| 2013/0217345 A1 | 8/2013 | Balteanu et al. |
| 2014/0015507 A1 | 1/2014 | Park et al. |

(Continued)

FOREIGN PATENT DOCUMENTS

| | | |
|---|---|---|
| CN | 202210758 | 5/2012 |
| CN | 201680019483.7 | 9/2017 |

(Continued)

OTHER PUBLICATIONS

International Search Report/Written Opinion dated Oct. 20, 2016 in PCT/US2016/017925.

*Primary Examiner* — Omoniyi Obayanju
(74) *Attorney, Agent, or Firm* — Chang & Hale LLP

(57) ABSTRACT

A voltage supply system is disclosed, comprising a boost converter configured to receive an input voltage and generate a first output voltage at a first output node, a low-voltage supply circuit configured to receive the input voltage and generate a second output voltage at a second output node, and a routing circuit configured to route the first output voltage of the boost converter to the second output node during a selected condition of the input voltage.

14 Claims, 6 Drawing Sheets

(56) References Cited

U.S. PATENT DOCUMENTS

| | | |
|---|---|---|
| 2014/0273897 A1* | 9/2014 | Drogi .................. H04B 1/0458 455/127.3 |
| 2014/0285261 A1 | 9/2014 | Dakshinamurthy et al. |
| 2015/0091497 A1 | 4/2015 | Leung et al. |
| 2016/0241138 A1 | 8/2016 | Pehlke |
| 2016/0241299 A1 | 8/2016 | Ripley |
| 2017/0133989 A1 | 5/2017 | Dykstra et al. |

FOREIGN PATENT DOCUMENTS

| | | |
|---|---|---|
| HK | 18102365.3 | 2/2018 |
| JP | 2009177987 | 8/2009 |
| JP | 2010115049 | 5/2010 |
| JP | 2010206875 | 9/2010 |
| KR | 20130090122 | 8/2013 |
| KR | 10-2017-7025794 | 9/2017 |
| WO | 2014160191 | 10/2014 |
| WO | PCT/US2016/017925 | 2/2016 |

\* cited by examiner

DEVICES AND METHODS RELATED TO BOOST SUPPLY FOR LOW BATTERY 2G BIAS SUPPORT

CROSS-REFERENCE TO RELATED APPLICATION(S)

This application is a continuation of U.S. patent application Ser. No. 15/043,613, filed Feb. 14, 2016, entitled "USE OF BOOST SUPPLY FOR LOW BATTERY 2G BIAS SUPPORT," which claims priority to U.S. Provisional Application No. 62/116,455, filed Feb. 15, 2015, entitled "USE OF BOOST SUPPLY FOR LOW BATTERY 2G BIAS SUPPORT," the disclosure of each of which is hereby expressly incorporated by reference herein in its entirety.

BACKGROUND

Field

The present disclosure relates to circuit designs for voltage supply systems.

Description of the Related Art

As battery technology and battery uses change, particularly for portable electronic devices, a need has arisen to support various voltage use situations. For example, an end-of-life operation of a 2G system differs from an end-of-life operation of a 3G/4G system.

Consequently, a need exists to provide multiple output voltages from a single input voltage source. While some attempts have been made to address this need, they have required the use of additional components adding a burdensome cost and component footprint to voltage supply system designs.

SUMMARY

According to some implementations, the present disclosure relates to a voltage supply system that includes a boost converter configured to receive an input voltage and generate a first output voltage at a first output node, a low-voltage supply circuit configured to receive the input voltage and generate a second output voltage at a second output node, and a routing circuit configured to route the first output voltage of the boost converter to the second output node during a selected condition of the input voltage In some embodiments, the input voltage of the voltage supply system is a battery voltage Vbatt. In some embodiments, the selected condition of the input voltage includes Vbatt being less than a selected value, and in some embodiments the selected value is 3.0V.

In some embodiments, the first output voltage of the voltage supply system is a high-voltage (HV) when not in the selected condition. In some embodiments, the HV output is configured as a supply voltage for an HV power amplifier (PA).

In some embodiments, the low-voltage supply circuit of the voltage supply system is a buck-boost converter. In some embodiments, the low-voltage supply circuit is a switched-mode-power-supply. In some embodiments, the low-voltage supply circuit is a DC-DC converter.

In some embodiments, the second output voltage of the voltage supply system at the second output node is configured as a 2G supply voltage. In some embodiments, the first output voltage at the first output node is configured as a 3G/4G supply voltage when not in the selected condition. In some embodiments, the first output voltage at the second output node is configured as a 2G supply voltage when in the selected condition.

In some embodiments, the voltage supply system further includes a controller configured to facilitate operation of the boost converter, the low-voltage supply circuit, and the routing circuit. In some embodiments, the boost converter of the voltage supply system includes first and second switches configured to allow switched mode operations. In some embodiments, the routing circuit of the voltage supply system includes a routing switch between the first output node and the second output node, the routing switch configured to be controlled by the controller.

In some embodiments, a routing circuit of the voltage supply system includes a PFET device between the first output node and the second output node, configured to be controlled by the controller.

A radio-frequency (RF) module is disclosed, including a packaging substrate configured to receive a plurality of components, and a power amplification system implemented on the packaging substrate, the power amplification system including a voltage supply system, the voltage supply system including a boost converter configured to receive an input voltage and generate a first output voltage at a first output node. The voltage supply system further includes a low-voltage supply circuit configured to receive the input voltage and generate a second output voltage at a second output node. The voltage supply system further includes a routing circuit configured to route the first output voltage of the boost converter to the second output node during a selected condition of the input voltage.

In some embodiments, the RF module is a front-end module (FEM). In some embodiments, the packaging substrate of the radio-frequency (RF) module includes a laminate substrate.

A wireless device is disclosed, including a transceiver configured to generate a radio-frequency (RF) signal, a front-end module (FEM) in communication with the transceiver, and an antenna in communication with the FEM, the antenna configured to transmit the amplified RF signal. The FEM of the wireless device includes a power amplification system configured to amplify the RF signal. The power amplification system includes a voltage supply system. The voltage supply system includes a boost converter configured to receive an input voltage and generate a first output voltage at a first output node, a low-voltage supply circuit configured to receive the input voltage and generate a second output voltage at a second output node, and a routing circuit configured to route the first output voltage of the boost converter to the second output node during a selected condition of the input voltage.

In some embodiments, the wireless device can be a cellular phone.

A method for operating a voltage supply system is disclosed, including generating a first output voltage with a boost converter based on an input voltage. The method includes configuring a routing circuit to allow the first output voltage to be delivered to a first output node when the input voltage is less than or equal to a selected value and routing the first output voltage to a second output node when the input voltage is greater than the selected value.

For purposes of summarizing the disclosure, certain aspects, advantages and novel features of the inventions have been described herein. It is to be understood that not necessarily all such advantages may be achieved in accordance with any particular embodiment of the invention.

DETAILED DESCRIPTION OF SOME EMBODIMENTS

The headings provided herein, if any, are for convenience only and do not necessarily affect the scope or meaning of the claimed invention.

Figure 1:
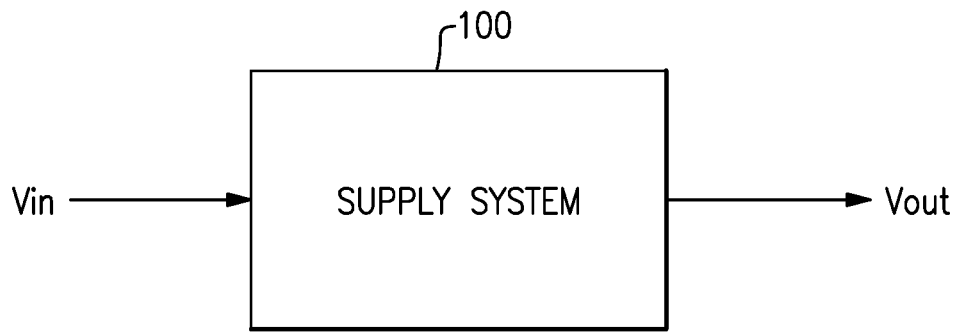
FIG. 1 shows a block diagram of a voltage supply system having one or more features, in accordance with some embodiments.

FIG. 1 shows a block diagram of a voltage supply system 100 having one or more features as described herein. Such a system can generate one or more output voltages (e.g., Vout) based on an input voltage (Vin).

Figure 2:
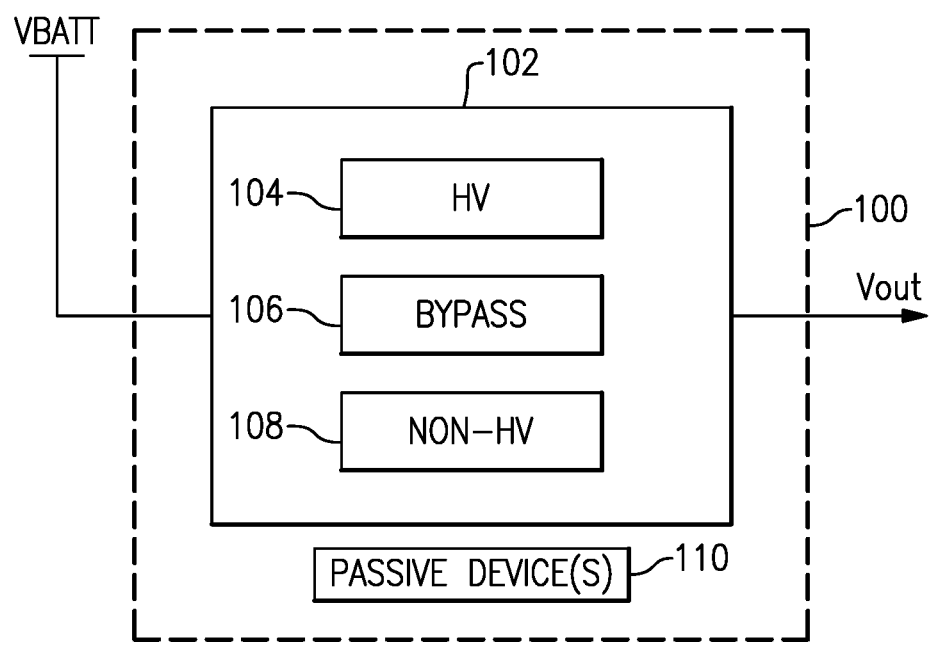
FIG. 2 shows a voltage supply system with a supply device, and a bypass system, in accordance with some embodiments.

FIG. 2 shows that in some embodiments, a voltage supply system 100 can include a supply device 102 (e.g., a die or a module) having a high-voltage (HV) source, a non-HV source, and a bypass system 106 configured to provide one or more bypass functionalities. The voltage supply system 100 can further include one or more passive devices 110 that can facilitate the various functionalities associated with the supply device 102. In some embodiments, the passive device(s) can be external to and electrically connected to the supply device.

In the example of FIG. 2, the input voltage is indicated as being provided by a battery (voltage Vbatt). However, it will be understood that one or more features of the present disclosure can also be implemented in systems where the input is from a source other than a battery.

Figure 3:
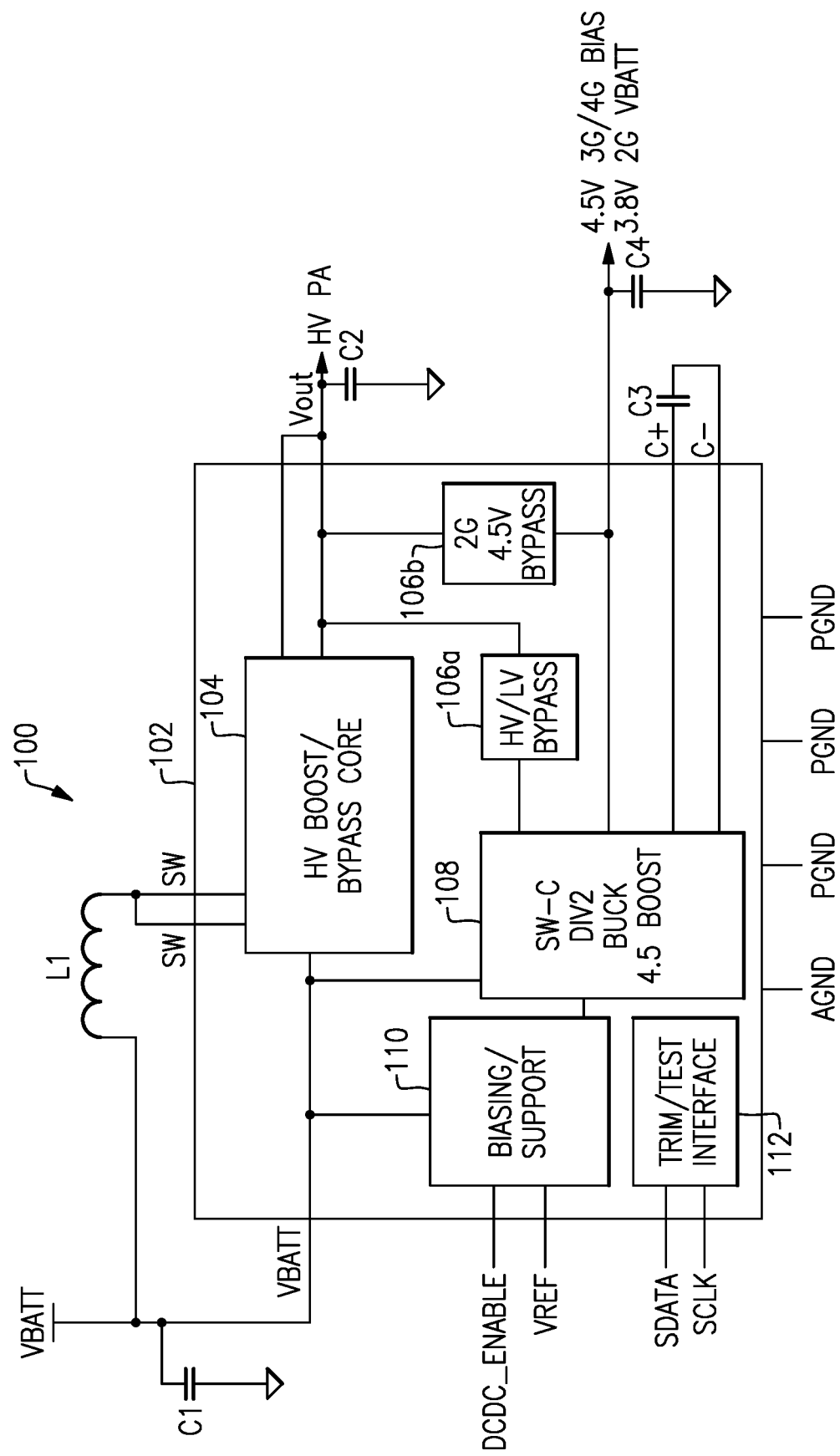
FIG. 3 shows a voltage supply system with a supply device, and a bypass system, in accordance with some embodiments.

FIG. 3 shows a more specific example of the voltage supply system 100 of FIG. 2. In the example of FIG. 3, a voltage supply system 100 is shown to include a supply device 102 (e.g., a die or a module) coupled to a battery voltage Vbatt as an input. The supply device 102 can include a high-voltage (HV) boost converter 104 coupled to Vbatt through an inductance L1 and switches SW1 and SW2. In some embodiments, the inductance L1 can be an inductor external to the supply device 102.

In some embodiments, the HV boost converter 104 can include a bypass core functionality. Examples related to such functionality are described herein in greater detail.

The HV boost converter 104 is shown to generate an output voltage Vout, and such an output can be provided to, for example, an HV power amplifier (PA) as a supply voltage. Such an HV PA can include, for example, an HV average power tracking (APT) PA.

In the example of FIG. 3, the HV boost converter 104 can operate with an output capacitance C2 and a feedback loop to maintain the output voltage Vout at or close to a set value. In some embodiments, the output capacitance C2 can be a capacitor external to the supply device 102. Additional details of the HV boost converter 104 are described herein in reference to FIG. 4.

In the example of FIG. 3, the supply device 102 can further include a buck-boost converter 108 configured to receive Vbatt as an input. The buck-boost converter 108 can be configured to generate an output including a low-voltage (LV) output which is shown to be provided to a second output node. The buck-boost converter 108 can also provide an output to the first output node (Vout) through a bypass circuit 106a. Examples related to the bypass circuit 106a are described herein in reference to FIG. 4.

In the example of FIG. 3, the supply device 102 can further include components such as a circuit 110 to provide biasing and/or support functionalities, and a trim/test interface 112.

In the example of FIG. 3, the output of the HV boost converter is shown to be coupled to the second output of the supply device 102 through a second bypass circuit 106b. As described herein, such a bypass circuit can provide a 2G voltage output from the HV boost converter 104 when necessary or desired.

It is noted that with changing battery technology and battery usage, there is significant interest in supporting end-of-life battery voltage operation in portable devices, down to, for example, 2.5V. Traditionally, end-of-life battery voltage is specified at 2.9-3.0V. As a result, many legacy power amplifier (PA) products, such as 2G PAs, typically need to be redesigned to support valid de-rated operation at these low battery voltage conditions.

Figure 4:
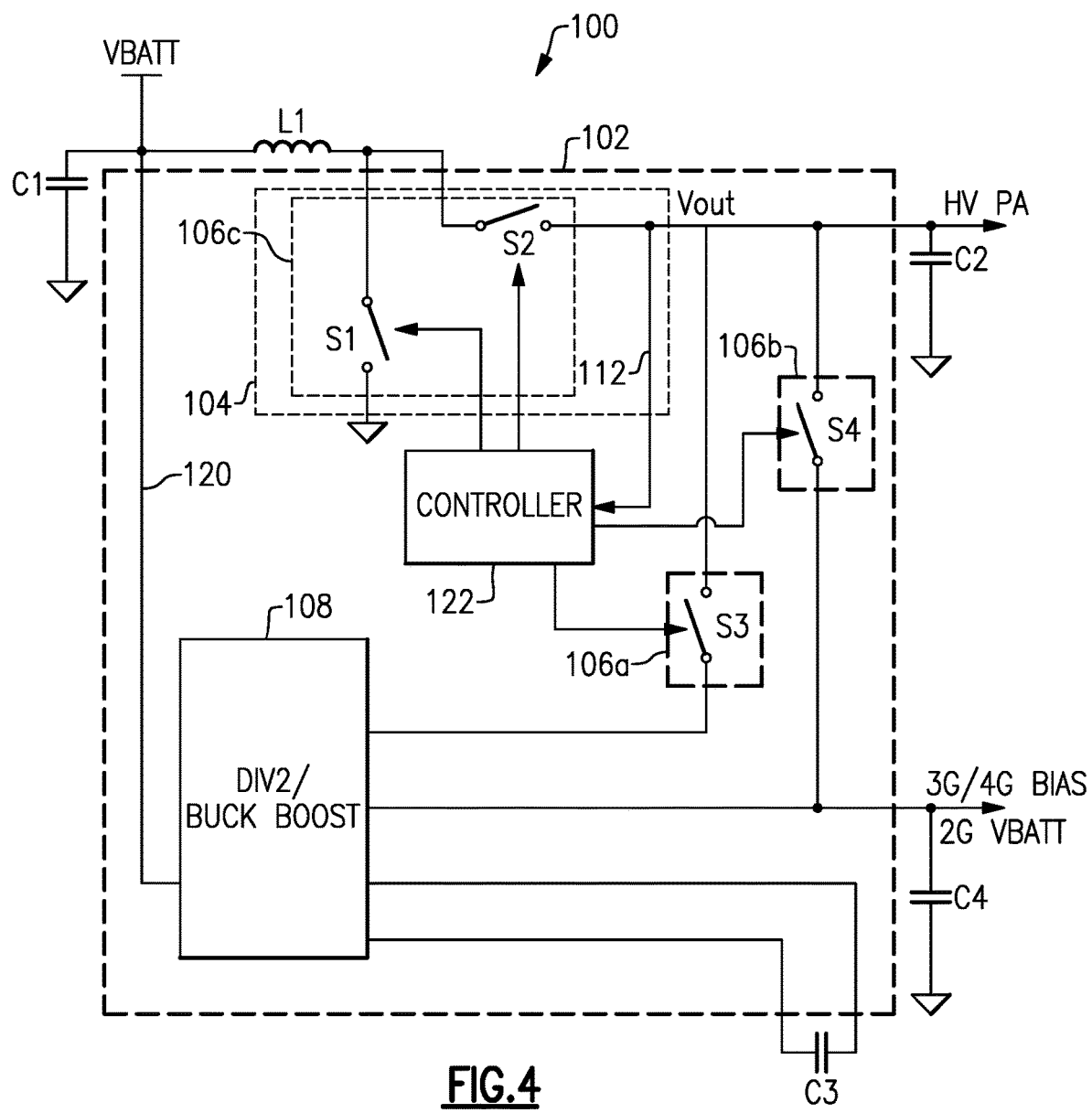
FIG. 4 shows a voltage supply system with a supply device, HV boost converter, and a bypass system, in accordance with some embodiments.

In some embodiments, the voltage supply system 100 of FIG. 3 can allow technology developed for the 3G/4G systems to be reconfigured for support of legacy PA products (such as 2G PA products) at, for example, 2.5V battery levels. FIG. 4 shows a more specific example of the voltage supply system 100 of FIG. 3.

In the example of FIG. 4, the supply device 102 of FIG. 3 is generally indicated as 102. The HV boost converter 104 is indicated as 104 for the purpose of generally depicting that such a portion of the HV boost converter can reside on the supply device 102. It will be understood, however, that the HV boost converter can include the output capacitor C2.

The HV boost converter 104 is shown to include first and second switches S1, S2 that can be operated under the control of a controller 122 so as to accumulate/transfer energy among the inductor L1 and the output capacitor C2 and generate a regulated output voltage Vout. Such regulation of the output voltage Vout can be facilitated by a feedback loop 112 and the controller 122.

In the example of FIG. 4, the bypass core functionality of the HV boost converter 104 can be provided by the switches S1 and S2, collectively indicated as 106c. When the voltage supply system 100 is in an HV output mode, both of the switches S1 and S2 can be operated in sequence to generate the HV output voltage. When the voltage supply system 100 is in a bypass mode, the first switch S1 can be turned OFF, and the second switch S2 can be turned ON. In such a state, the input voltage Vbatt can be provided directly to the output node as Vout Vbatt. Such an output voltage can be utilized for medium-voltage applications.

In the example of FIG. 4, bypass functionality can also be facilitated by a third switch S3 under the control of the controller 122. Such a switch, indicated as 106a, can provide the HV/LV bypass functionality (106a) of FIG. 3. For example, when S3 is OFF, the voltage supply system 100 can operate in the HV or medium-voltage output mode as described above. To operate in the LV mode with the buck-boost 108, S3 can be turned ON, and both of S1 and S2 can be turned OFF.

In the example of FIG. 4, bypass/re-routing functionality can also be facilitated by a fourth switch S4 under the control of the controller 122. Such a switch, indicated as 106b, can allow an output of the HV boost converter 104 to be provided to the second output of the voltage supply system 100. In the example of FIG. 4, such a second output is indicated as 3G/4G Bias and 2G Vbatt, and is also an output of the buck-boost 108. To achieve the foregoing routing of the output of the HV boost converter 104 to the second output, S4 can be ON, S3 can be OFF, and S1 and S2 can be operated in switch mode as described herein. To disable the foregoing routing functionality, S4 can be OFF, and the remaining switches can be operated as described herein.

Table 1 summarizes the example switching configurations for operating the voltage supply system 100 in multiple modes, and for providing one or more routing functionalities as described herein. In Table 1, Output 1 refers to the output indicated as HV PA in FIG. 4, and Output 2 refers to the output indicated as 3G/4G Bias and 2G Vbatt.

TABLE 1

| Mode | Output | S1 | S2 | S3 | S4 |
|---|---|---|---|---|---|
| Low-voltage (buck-boost) | 2 | OFF | OFF | OFF | OFF |
| Low-voltage (buck-boost) | 1 | OFF | OFF | ON | OFF |
| Medium-voltage (Vbatt) | 1 | OFF | ON | OFF | OFF |
| High-voltage (boost converter) | 1 | Switched | Switched | OFF | OFF |
| Low-voltage (boost converter) | 2 | Switched | Switched | OFF | ON |

In some embodiments, the example voltage supply system 100 of FIGS. 3 and 4 can be implemented by integrating a PFET switch device as switch S4 (106b) to thereby allow the connection of the HV boost converter 104 (e.g., operating as a 3G/4G switching mode power supply (SMPS)) output to the bias input of legacy 2G products (e.g., at the second output of the voltage supply system 100). Such use of a 3G/4G power supply for 2G use can take advantage of typical cellular portable device configurations which do not need to simultaneously support both 3G/4G and 2G operations. During 2G operation, the SMPS can be configured to deliver 3.2V, thus allowing operation of the 2G amplifier in de-rated conditions from a 2.5V battery voltage.

It is further noted that the foregoing voltage supply system 100 can be implemented with no additional passive devices or significant signal routing. The slight additional overhead associated with the implementation of the PFET switch can be easily absorbed into the SMPS circuit.

Figure 5:
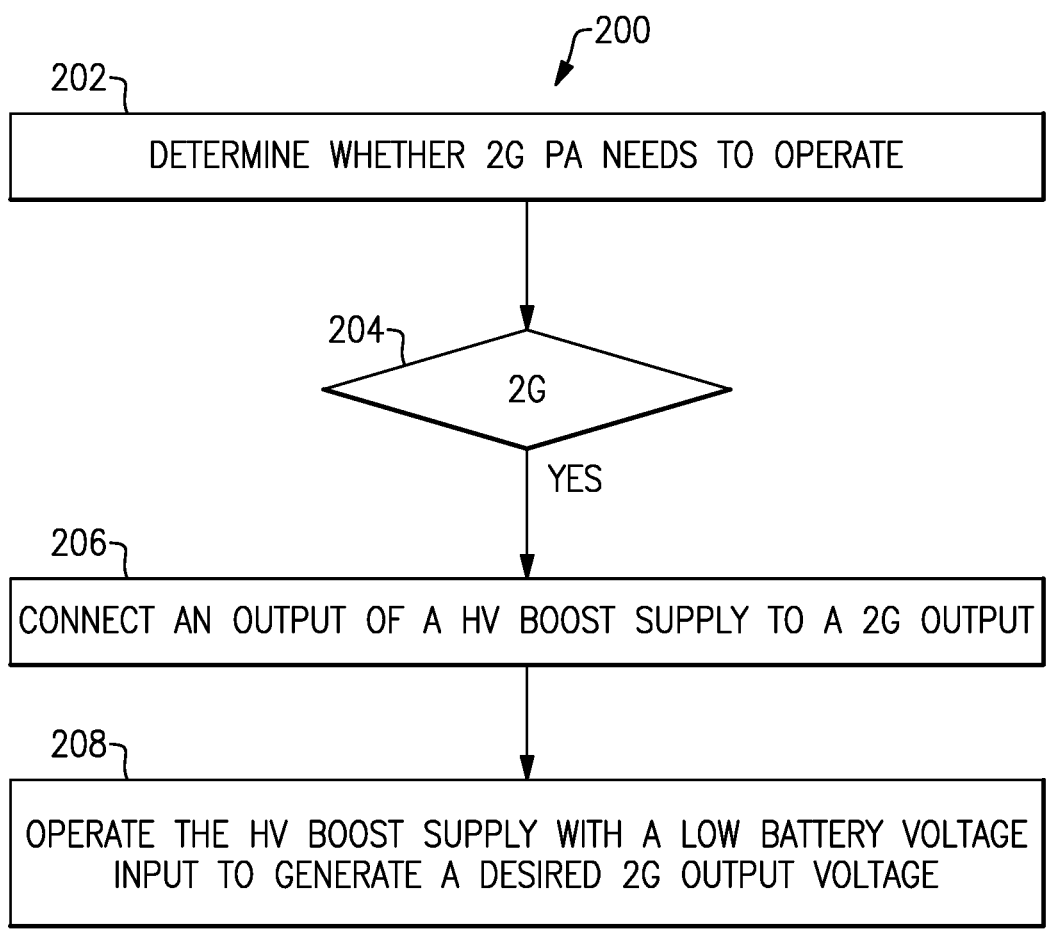
FIG. 5 shows a process for providing a boosted supply voltage to generate a desired output voltage, in accordance with some embodiments.

FIG. 5 shows a process 200 that can be implemented to provide one or more features as described herein. In block 202, the process 200 can determine whether 2G PA needs to operate. If Yes in a decision block 204, the process, in block 206, can implement a switching configuration to connect an output of a HV boost supply to a 2G supply output. In block 208, the HV boost supply can be operated with a low voltage input to generate a desired 2G output voltage.

Figure 6:
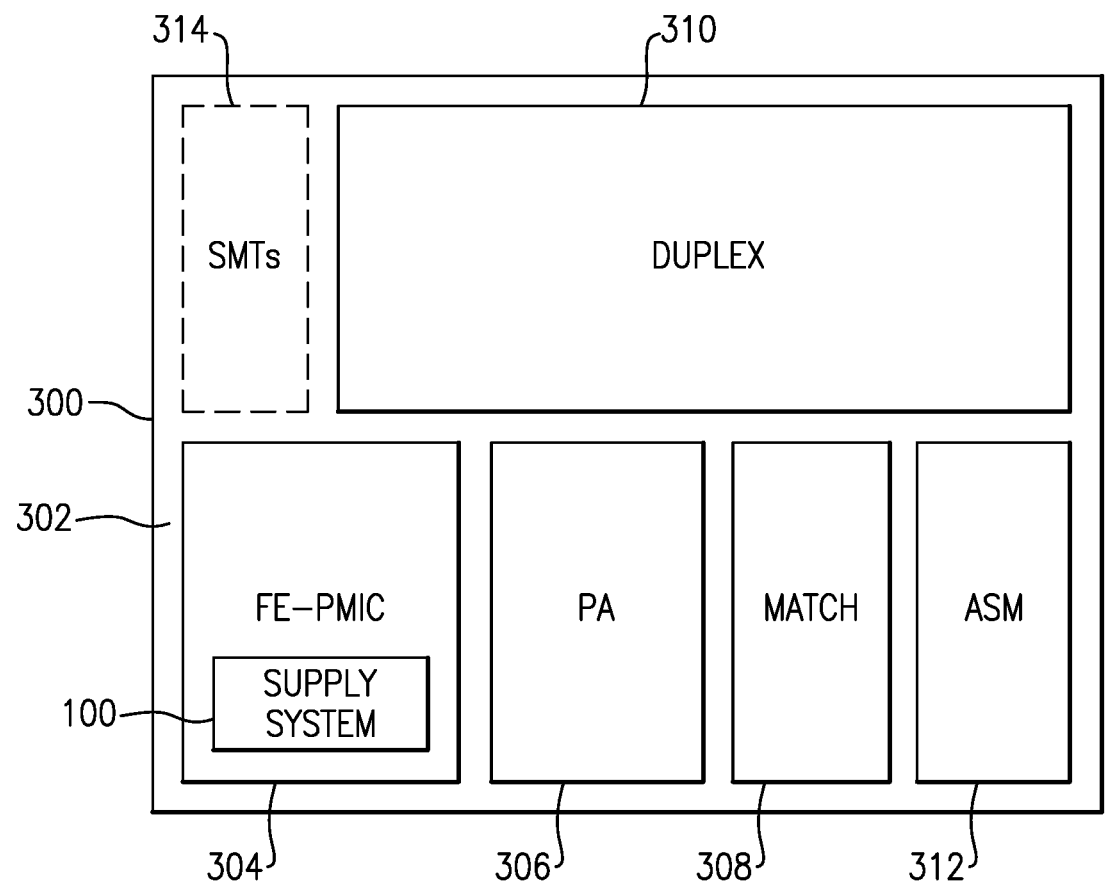
FIG. 6 shows an example module implementing some or all of the voltage supply system having one or more advantageous features described herein.

FIG. 6 shows that in some embodiments, some or all of the voltage supply system having one or more features as described herein (e.g., 100 in FIGS. 2-4) can be implemented in a module. Such a module can be, for example, a front-end module (FEM). In the example of FIG. 6, a module 300 can include a packaging substrate 302, and a number of components can be mounted on such a packaging substrate. For example, an FE-PMIC component 304, a power amplifier assembly 306, a match component 308, and a duplexer assembly 310 can be mounted and/or implemented on and/or within the packaging substrate 302. Other components such as a number of SMT devices 314 and an antenna switch module (ASM) 312 can also be mounted on the packaging substrate 302. Although all of the various components are depicted as being laid out on the packaging substrate 302, it will be understood that some component(s) can be implemented over other component(s). In some embodiments, a voltage supply system 100 having one or more features as described herein can be implemented as a part of the FE-PMIC component 304.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 7:
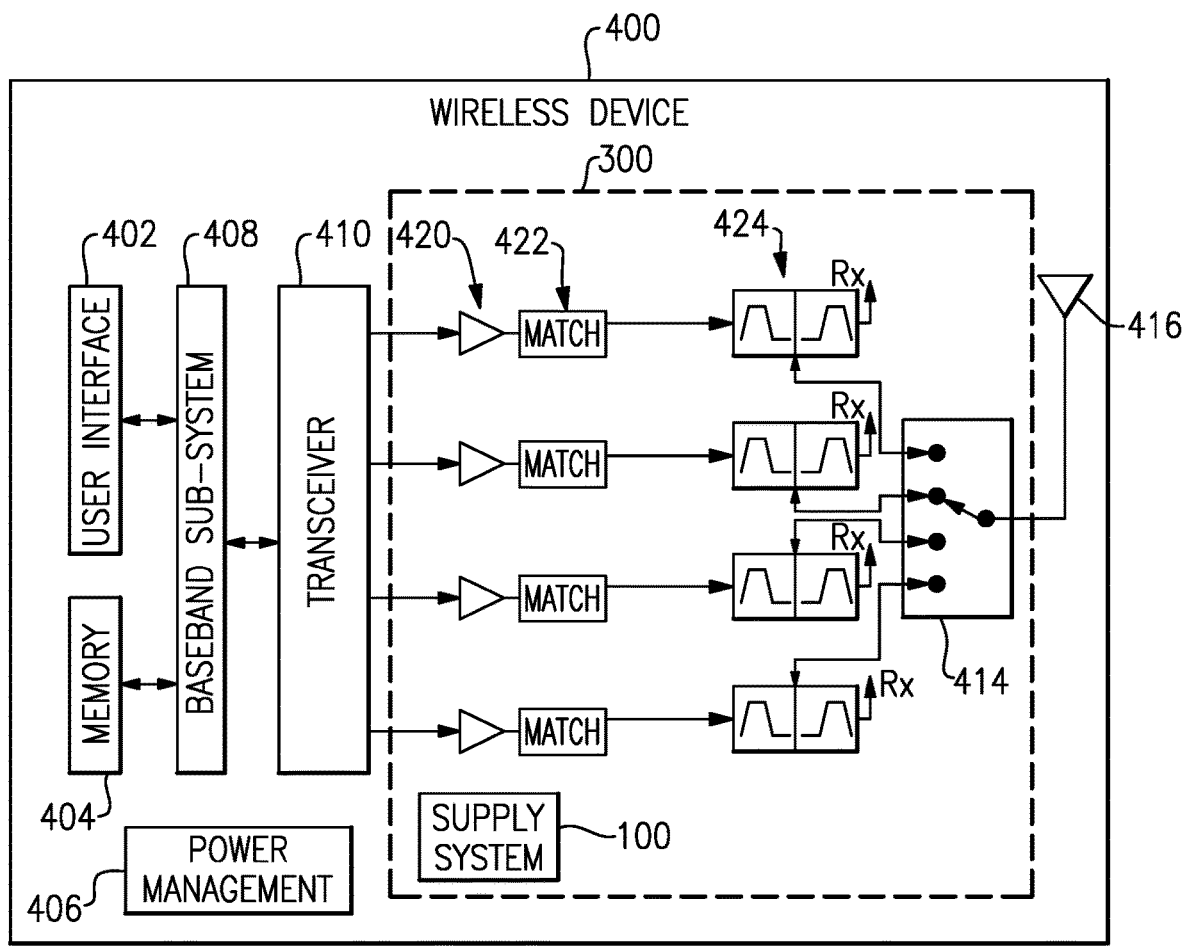
FIG. 7 depicts an example wireless device having one or more advantageous features described herein.

FIG. 7 depicts an example wireless device 400 having one or more advantageous features described herein. In the context of a module having one or more features as described herein, such a module can be generally depicted by a dashed box 300, and can be implemented as, for example, a front-end module (FEM).

Referring to FIG. 7, power amplifiers (PAs) 420 can receive their respective RF signals from a transceiver 410 that can be configured and operated in known manners to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 can also be in communication with a power management component 406 that is configured to manage power for the operation of the wireless device 400. Such power management can also control operations of the baseband sub-system 408 and the module 300.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400, outputs of the PAs 420 are shown to be matched (via respective match circuits 422) and routed to their respective duplexers 420. Such amplified and filtered signals can be routed to an antenna 416 through an antenna switch 414 for transmission. In some embodiments, the duplexers 420 can allow transmit and receive operations to be performed simultaneously using a common antenna (e.g., 416). In FIG. 7, received signals are shown to be routed to "Rx" paths (not shown) that can include, for example, a low-noise amplifier (LNA).

In some embodiments, a voltage supply system 100 as described herein can be implemented as a part of the module 300.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of operating a voltage supply system, the method comprising:
   providing a boost converter configured to receive an input voltage and generate a first output voltage at a first output node;
   providing a low-voltage supply circuit with a plurality of outputs configured to receive the input voltage and generate a second output voltage at a second output node among the plurality of outputs; and
   providing a routing circuit configured to route the first output voltage of the boost converter to the second output node of the low-voltage supply circuit, during a selected condition of the input voltage, the routing circuit including a routing switch between the first output node and the second output node.

2. The method of claim 1 wherein the input voltage is a battery voltage Vbatt.

3. The method of claim 2 wherein the selected condition of the input voltage includes Vbatt being less than a selected value.

4. The method of claim 3 wherein the selected value is 3.0V.

5. The method of claim 3 wherein the first output voltage is a high-voltage (HV) when not in the selected condition.

6. The method of claim 5 wherein the HV output is configured as a supply voltage for an HV power amplifier (PA).

7. The method of claim 1 wherein the low-voltage supply circuit is a buck-boost converter.

8. The method of claim 1 wherein the second output voltage at the second output node is configured as a 2G supply voltage.

9. The method of claim 8 wherein the first output voltage at the first output node is configured as a 3G/4G supply voltage when not in the selected condition.

10. The method of claim 8 wherein the first output voltage at the second output node is configured as a 2G supply voltage when in the selected condition.

11. The method of claim 1 further comprising providing a controller configured to facilitate operation of the boost converter, the low-voltage supply circuit, and the routing circuit.

12. The method of claim 11 wherein the boost converter includes first and second switches configured to allow switched mode operations.

13. The method of claim 12 wherein the routing switch is configured to be controlled by the controller.

14. The method of claim 13 wherein the routing switch includes a PFET device.

* * * * *